(12) United States Patent
Li et al.

(10) Patent No.: US 8,654,826 B2
(45) Date of Patent: Feb. 18, 2014

(54) MULTI-STAGE PHASE ESTIMATION METHOD AND APPARATUS

(75) Inventors: Jianqiang Li, Beijing (CN); Zhenning Tao, Beijing (CN); Lei Li, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/446,690

(22) Filed: Apr. 13, 2012

(65) Prior Publication Data

US 2012/0269247 A1 Oct. 25, 2012

(30) Foreign Application Priority Data

Apr. 14, 2011 (CN) .......................... 2011 1 0093739

(51) Int. Cl.
*H04B 3/46* (2006.01)

(52) U.S. Cl.
USPC ............. 375/224; 398/202; 398/65; 375/316; 375/320

(58) Field of Classification Search
None
See application file for complete search history.

(56) References Cited

U.S. PATENT DOCUMENTS

| | | | | |
|---|---|---|---|---|
| 2002/0186788 | A1* | 12/2002 | Patel et al. | .................... 375/316 |
| 2010/0021163 | A1* | 1/2010 | Shieh | ............................. 398/65 |
| 2011/0318021 | A1* | 12/2011 | Zhou | ............................ 398/202 |

* cited by examiner

*Primary Examiner* — Leon-Viet Nguyen
(74) *Attorney, Agent, or Firm* — Staas & Halsey LLP

(57) ABSTRACT

The embodiments provide a multi-stage phase estimation method and apparatus. The apparatus is a multi-stage phase estimation configuration. Each stage of the phase estimation configuration includes metric computation modules. Each of the metric computation modules computing a distance metric and search phase angles according to an input signal and an initial search phase angle or a search phase angle of the former stage phase estimation configuration. The number of the metric computation modules is equal to that of the search phase angles of this stage. A selection module selects the search phase angle corresponding to the minimal distance metric as the phase estimation result output of this stage according to the computation results of all metric computation modules. The average time window length of the former stage phase estimation configuration is larger than that of the subsequent stage phase estimation configuration.

10 Claims, 4 Drawing Sheets

(Abstract Figure, Figure 1)

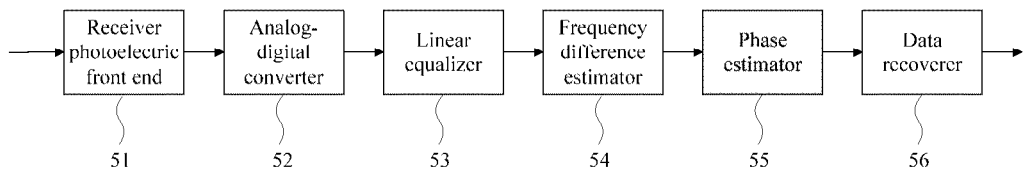
Figure 5
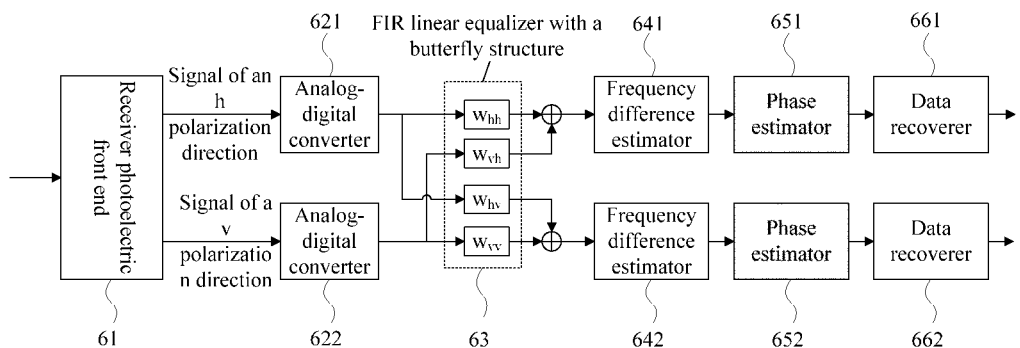
Figure 6
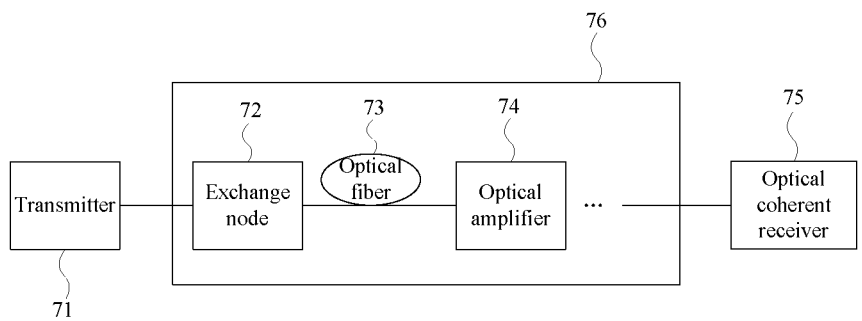
Figure 7
Performing phase estimation to an input signal by using a multi-stage phase estimation configuration; wherein the average time window length of the former stage phase estimation configuration is larger than that of the subsequent stage phase estimation configuration. ⎯ 801
Figure 8

MULTI-STAGE PHASE ESTIMATION METHOD AND APPARATUS

CROSS REFERENCE TO RELATED APPLICATIONS

This application claims the benefit of Chinese Application No. 201110093739.8, filed Apr. 14, 2011, the disclosure of which is incorporated herein by reference.

TECHNICAL FIELD

The embodiments relate to the field of optical communication, and in particular to a multi-stage phase estimation method and apparatus.

BACKGROUND ART

High-speed large-capacity optical fiber transmission systems are directions of development for future optical communications, in which high-order quadrature amplitude modulation (QAM) formats combined with coherent receiving technique provide a promising solution. On the one hand, the use of QAM formats may improve the spectral efficiency and lower the demand for the electro-optic bandwidth; and on the other hand, the coherent receiving technique may allow for overcoming the signal transmission impairments with the powerful digital signal processing (DSP) techniques while improving the receiving sensitivity.

Since the existence of the laser phase noise, a carrier phase estimator is an indispensable device in a typical digital coherent receiver. In addition, in a practical application, it is often expected to use a feed-forward blind phase estimation method to avoid the use of a training sequence, thereby improving the transmission efficiency of information. However, the tolerance of a QAM signal to a laser phase noise significantly decreases as the modulation order increases, and since the constellation points of a high-order QAM signal are more dense, the conventional feed-forward blind carrier phase estimation algorithms are hard to be expended to a high-order QAM signal (documentations[1-4]), this brings forward a high requirement on the feed-forward blind carrier phase estimation modules.

Among various proposed feed-forward blind carrier phase estimation algorithms, a feed-forward algorithm (documentations or references[5-7]) based on blind phase search (BPS) (note: in different references, the English names of such an algorithm are not completely the same and have no definite Chinese names, which are collectively referred to as an algorithm based on blind phase search in this application) has many advantages, such as better phase noise tolerance, parallel processing feasibility, and universality to all-order QAM formats, etc. The principle of such an algorithm is relatively simple, but its implementation complexity is very high. An effective solution is to expand a single-stage phase estimation module to a multi-stage module to reduce the number of phase angles needed in the phase search, thereby reduce the complexity.

Several multi-stage phase estimation algorithms were proposed in documentations or references[8-11], in which the complexity was reduced by a factor of 1.5 to 3. Where the algorithm proposed in documentations[10] may be used for reference. In the two-stage phase estimation configuration proposed in documentations[10], each stage is based on the phase search algorithm, where the former stage may be regarded as a coarse search of the latter, and the latter stage is a fine search conducted on the basis of the former stage estimated phase, thereby reducing the number of the phase angles for the phase search while ensuring the precision of the phase estimation. However, since average time window with identical lengths are used in its two-stage configuration, the number of the phase angles needed in the first stage is still very large due to the influence of the pattern effect, and thus, the reduction of its complexity is still limited.

Following documentations or references may be helpful to the understanding of the embodiments and the conventional technologies listed below, which are incorporated herein by reference as they are completely set forth in this text.

[1] R. Noé, "Phase noise tolerant synchronous QPSK/BPSK baseband-type intradyne receiver concept with feed-forward carrier recovery," J. Lightw. Technol., vol. 23, no. 2, pp. 802-808, February 2005.

[2] H. Louchet, K. Kuzmin, and A. Richter, "Improved DSP algorithms for coherent 16-QAM transmission," PaperTu.1.E.6, in Proc. ECOC2008, Brussels, Belgium, Sep. 21-25, 2008.

[3] M. Seimetz, "Laser linewidth limitations for optical systems with high-order modulation employing feedforward digital carrier phase estimation," PaperOTuM2, in Proc. OFC2008, San Diego, Calif., Feb. 24-28, 2008.

[4] I. Fatadin, D. Ives, and S. J. Savory, "Laser linewidth tolerance for 16QAM coherent optical systems using QPSK partitioning," IEEE Photon. Technol. Lett., vol. 22, no. 9, pp. 631-633, May 2010.

[5] S. K. Oh and S. P. Stapleion, "Blind phase recovery using finite alphabet properties in digital communications," Electronics Letters, vol. 33, no. 3, pp. 175-176, January 1997.

[6] F. Rice, B. Cowley, B. Moran, and M. Rice, "Cramér-Rao lower bounds for QAM phase and frequency estimation," IEEE Transactions on Communications, vol. 49, no. 9, pp. 1582-1591, September 2001.

[7] T. Pfau, S. Hoffmann, and R. Noe, "Hardware-efficient coherent digital receiver concept with feed-forward carrier recovery for M-QAM constellations," Journal of Lightwave Technology, vol. 27, no. 8, pp. 989-999, Apr. 15, 2009.

[8] T. Pfau, and R. Noe, "Phase-noise-tolerant two-stage carrier recovery concept for higher order QAM formats," IEEE Journal of Selected Topics on Quantum Electronics, vol. 16, no. 5, pp. 1210-1216, 2010.

[9] X. Zhou, "An improved feed-forward carrier recovery algorithm for coherent receivers with M-QAM modulation format," IEEE Photonics Technology Letters, vol. 22, no. 14, pp. 1051-1053, July 2010.

[10] X. Li, Y. Cao, S. Yu, W. Gu, and Y. Ji, "A Simplified Feed-Forward Carrier Recovery Algorithm for Coherent Optical QAM System," Journal of Lightwave Technology, vol. 29, no. 5, pp. 801-807, March 2011.

[11] Q. Zhuge, C. Chen, and D. V. Plant, "Low computation complexity two-stage feedforward carrier recovery algorithm for M-QAM," Paper OMJ5, presented in OFC2011, Los Angeles, Calif., March 2011.

SUMMARY

An aspect of the embodiments is to provide a multi-stage phase estimation method and apparatus, in which the limitation that the average time window length of each stage phase estimation configuration is of the same length is eliminated, such that the laser phase noise tolerance identical to a single stage is ensured and the total number of the phase angles needed in the phase search is further reduced, thereby realizing a lower complexity.

According to an aspect of the embodiments, there is provided a multi-stage phase estimation apparatus, includes a multi-stage phase estimation configuration, where each stage of the phase estimation configuration includes:

a plurality of metric computation modules, each of the metric computation modules being used to compute distance metric and search phase angles according to an input signal and an initial search phase angle or a search phase angle of the former stage phase estimation configuration, where the number of the metric computation modules is equal to that of the search phase angles of this stage; and a selection module to select the search phase angle corresponding to the minimal distance metric as the phase estimation result output of this stage according to the computation results of all metric computation modules;

where the average time window length of the former stage phase estimation configuration is larger than that of the subsequent stage phase estimation configuration.

According to another aspect of the embodiments, there is provided a digital coherent receiver, including the multi-stage phase estimation apparatus as described above.

According to another aspect of the embodiments, there is provided a polarization-diversity digital coherent receiver, including the multi-stage phase estimation apparatus as described above.

According to a further aspect of the embodiments, there is provided a multi-stage phase estimation method, including:

performing phase estimation to an input signal by using a multi-stage phase estimation configuration;

where the average time window length of the former stage phase estimation configuration is larger than that of the subsequent stage phase estimation configuration.

The advantages of the embodiments are that the limitation that the average time window length of each stage phase estimation configuration is of the same length is eliminated, while average time window lengths of non-identical lengths are used, the pattern effect is overcome while ensuring the laser phase noise tolerance, further reducing the implementation complexity of the phase estimation. When the multi-stage phase estimation apparatus and corresponding phase estimation method are applied to digital coherent receivers or polarization-diversity digital coherent receivers, the implementation complexity and cost in the process of phase estimation may be reduced.

The particular embodiments are disclosed in detail with reference to the following description and drawings, indicating the modes in which the principle embodiments may be adopted. It should be understood that the scope of the embodiments are not limited thereto. The embodiments may include many alternations, modifications and equivalents within the scope of the spirits and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" or "including/includes when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 5 is a schematic diagram of the structure of an embodiment of a digital coherent receiver;

FIG. 6 is a schematic diagram of the structure of an embodiment of a polarization-diversity digital coherent receiver;

FIG. 7 is a schematic diagram of the structure of an embodiment of the optical communication system using the coherent receiver shown in FIG. 5 or 6; and FIG. 8 is a flowchart of an embodiment of the multi-stage phase estimation method.

DETAILED DESCRIPTION

Various embodiments are described as follows with reference to the drawings. Such embodiments are exemplary only, and are not limit them. For better understanding of the principle and embodiments by those skilled in the art, the embodiments are described taking estimation of laser phase noise in an optical communication system as an example. However, it should be noted that the embodiments are applicable to all the communication systems where phase noises exist, and are not limited to an optical communication system.

Figure 1:
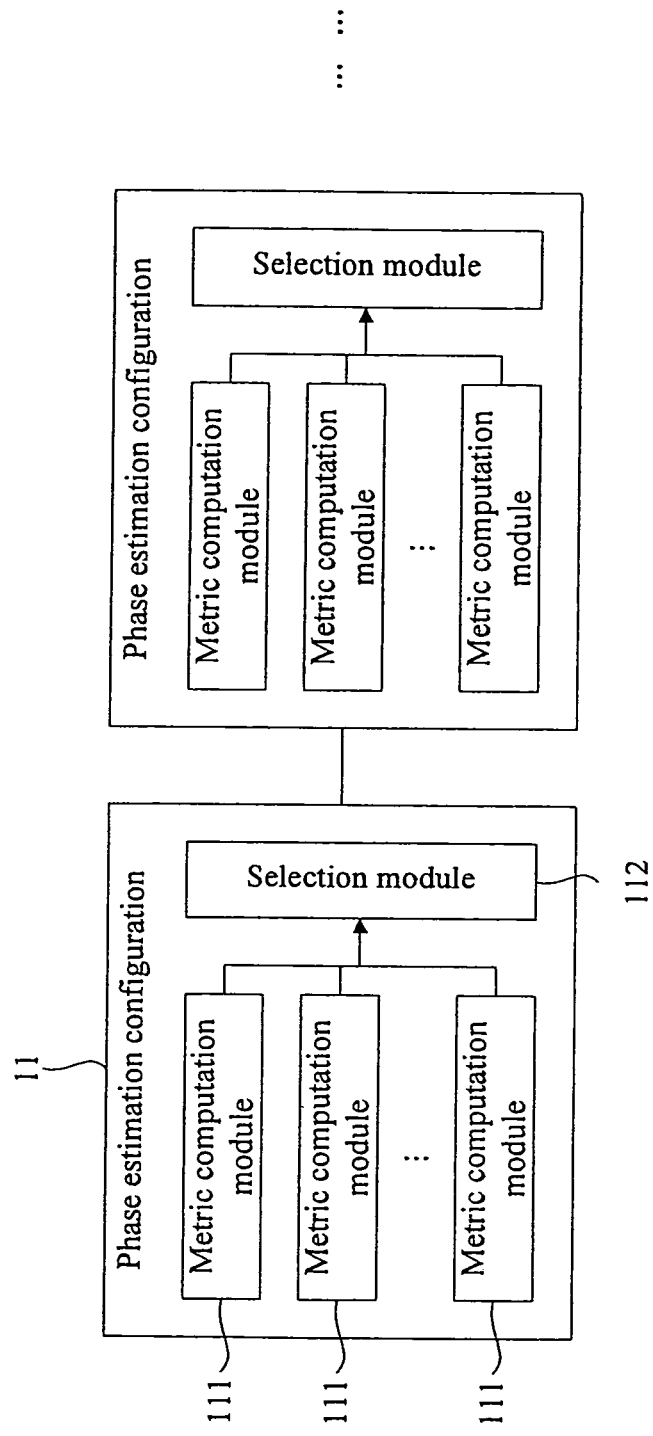
FIG. 1 is a schematic diagram of the structure of an embodiment of the multi-stage phase estimation apparatus.

FIG. 1 is a schematic diagram of the structure of an embodiment of the multi-stage phase estimation apparatus. As shown in FIG. 1, the multi-stage phase estimation apparatus includes a multi-stage phase estimation configuration 11, each stage of the phase estimation configuration 11 including a plurality of metric computation modules 111 and a selection module 112, where the number of the metric computation modules 111 is equal to that of the search phase angles of this stage. Where each of the metric computation modules 111 is used to compute distance metric and search phase angles according to an input signal and an initial search phase angle or a search phase angle of the former stage phase estimation configuration; and the selection module 112 is used to select the search phase angle corresponding to the minimal distance metric as the phase estimation result output of this stage according to the computation results of all metric computation modules 111.

In this embodiment, the average time window length of the former stage phase estimation configuration is larger than that of the subsequent stage phase estimation configuration.

The limitation that the average time window length of each stage phase estimation configuration is of the same length is eliminated in the multi-stage phase estimation apparatus of this embodiment while average time window lengths of non-identical lengths are used, the pattern effect is overcome while ensuring the laser phase noise tolerance, further reducing the implementation complexity of the phase estimation. When the multi-stage phase estimation apparatus are applied to digital coherent receivers or polarization-diversity digital coherent receivers, the implementation complexity and cost in the process of phase estimation may be reduced.

In this embodiment, each stage phase estimation configuration preferably uses a BPS (blind phase search) algorithm.

In this embodiment, the optimal value of the average time window length of the last-stage phase estimation configuration is equal to or approximately equal to the optimal average time window length in the case where a single-stage phase estimation configuration is used only. Where the single-stage phase estimation configuration refers to that only one stage phase estimation configuration is used to estimate the phase of an input signal. In such a case, if the single-stage phase estimation configuration uses the algorithm same as that used by the multi-stage phase estimation configuration of this embodiment, the optimal average time window length in the case of single-stage phase estimation configuration is equal to or approximately equal to the optimal value of the average time window length of the last-stage phase estimation configuration of this embodiment.

In this embodiment, the absolute value of the difference between the product of the numbers of the search phase angles of each stage of the phase estimation configurations and the total number of the search phase angles needed in the case of a single-stage phase estimation configuration is minimal, and the sum of the numbers of the search phase angles of each stage of the phase estimation configurations is minimal. Where, the meaning of a single-stage phase estimation configuration is the same as that described above, and shall not be described any further.

The multi-stage phase estimation apparatus of this embodiment will be described below in detail by an example of a multi-stage estimation configuration. In this embodiment, the first stage and the second stage shall be taken as examples, and the processing of the third stage to the last stage is the same as that of the second stage, and shall not be described any further.

Figure 2:
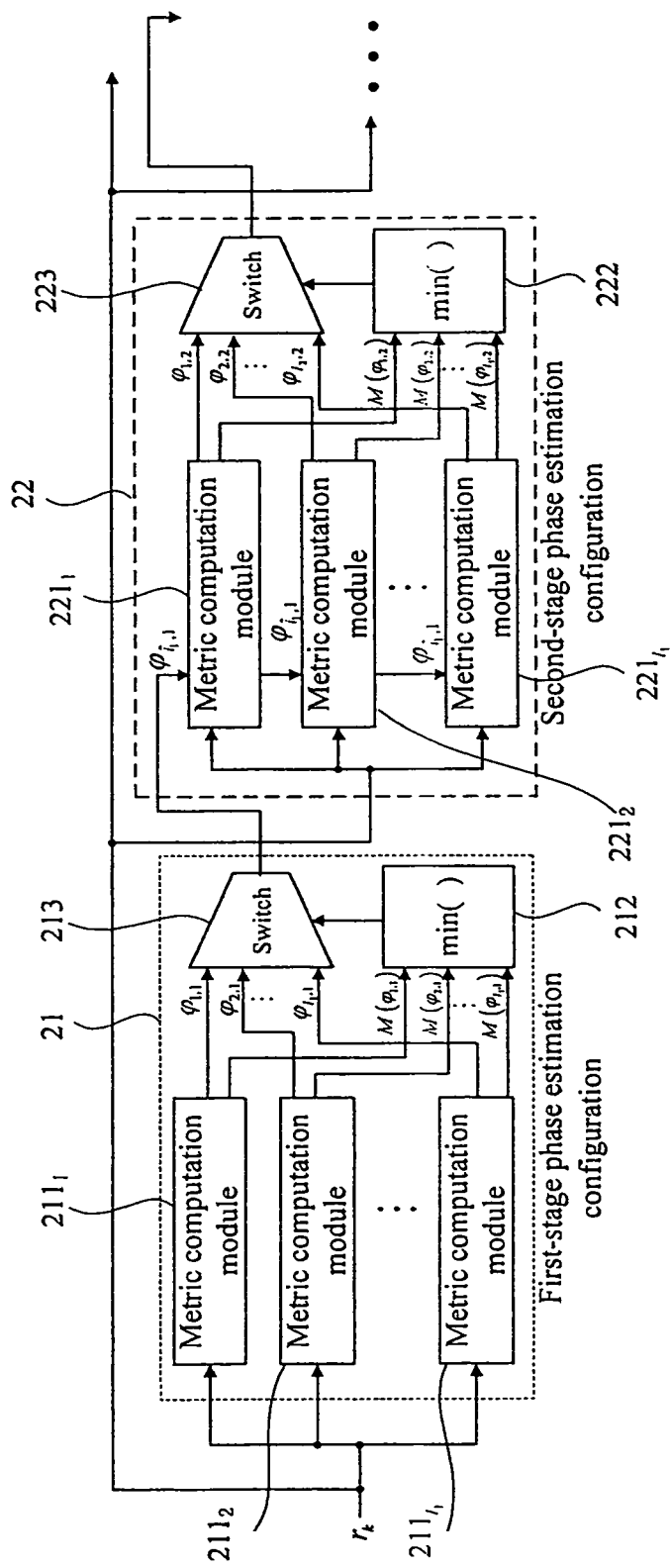
FIG. 2 is a schematic diagram of the structure of the implementation of the multi-stage phase estimation apparatus of the embodiment shown in FIG. 1.

FIG. 2 is a schematic diagram of the structure of the implementation of the multi-stage phase estimation apparatus of the embodiment shown in FIG. 1. As shown in FIG. 2, the multi-stage phase estimation apparatus includes a multi-stage phase estimation configuration. In FIG. 2, a first-stage phase estimation configuration 21 and a second-stage phase estimation configuration 22 are shown. Where the first-stage phase estimation configuration 21 includes a plurality of metric computation modules $211_1$, $211_2$ ... $211_{I_1}$, each of the metric computation modules $211_1$, $211_2$ ... or $211_{I_1}$ being used to compute distance metric $M(\phi_{1,1})$, $M(\phi_{2,1})$ ... $M(\phi_{I_1,1})$ used for phase search and search phase angles $\phi_{1,1}, \phi_{2,1} \ldots \phi_{I_1,1}$ according to an input signal $r_k$ and a respective initial search phase angle $\phi_{1,1}, \phi_{2,1} \ldots \phi_{I_1,1}$ where $I_1$ is the number of the search phase angles of the first-stage phase estimation configuration. In this embodiment, since the first-stage phase estimation configuration 21 is the first stage of the whole multi-stage phase estimation configuration and is different from other stages, its search phase angles used for every metric computation modules are directly obtained by calculating the number of the first-stage phase angles, and in principle, the search phase angles are distributed between $-\pi/4$ and $\pi/4$ at equal intervals.

The first-stage phase estimation configuration 21 further includes a selection module. In this embodiment, the selection module is implemented by a minimum value selector 212 and a shifter 213. By using the minimum value selector 212 and the shifter 213, the search phase angle corresponding to the minimal distance metric is selected as the phase estimation result output of the first-stage phase estimation configuration 21.

Figure 3:
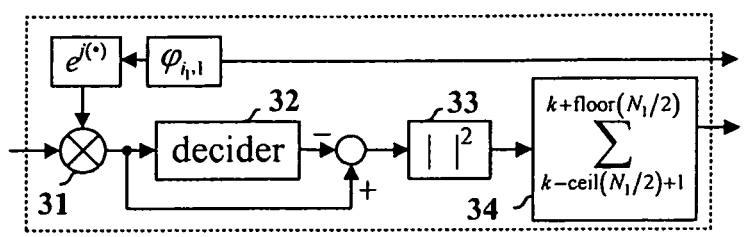
FIG. 3 is a schematic diagram of the structure of each metric computation module of a first stage phase estimation configuration of the embodiment shown in FIG. 2.

In the first-stage phase estimation configuration 21, each of the metric computation modules may be implemented by the configuration shown in FIG. 3. As shown in FIG. 3, the metric computation module includes a multiplier 31, a decider 32, a first calculator 33, and a second calculator 34, where the multiplier 31 is used to multiply the complex to which the search angle corresponds by the input signal $r_k$, such that the phase of input signal is rotated by a corresponding angle; the decider 32 is used to perform hard decision to the output of the multiplier 31 according to QAM constellations;

the first calculator 33 is used to calculate the square of the modulus of the difference between the output of the multiplier 31 and the output of the decider 32; and the second calculator 34 is used to sum the output of the first calculator 33 within an average time window of a length of $N_j$ to obtain the distance metric value. Where, since the phase estimation configuration of this stage is a first-stage phase estimation configuration, j is 1.

The second-stage phase estimation configuration 22 includes a plurality of metric computation modules $221_1$, $221_2 \ldots 221_{I_1}$, each of the metric computation modules $211_1$, $211_2 \ldots$ or $221_{I_1}$ being used to compute distance metric $M(\phi_{1,2}), M(\phi_{2,2}) \ldots M(\phi_{I_2,2})$ used for phase search and search phase angles $\phi_{1,2}, \phi_{2,2} \ldots \phi_{I_2,2}$ according to an input signal $r_k$ and the search phase angle $\phi_{\tilde{i}_1}$ of the phase estimation configuration of the former stage, wherein $I_2$ is the number of the search phase angles of the second-stage phase estimation configuration. In this embodiment, each of the metric computation modules obtains the search phase angle of its own through calculation according to the search phase angle output by the phase estimation configuration of the former stage, i.e. for the second stage, the search phase angle output by the first-stage phase estimation configuration.

The second-stage phase estimation configuration 22 further includes a selection module. In this embodiment, the selection module is implemented by a minimum value selector 222 and a shifter 223. By using the minimum value selector 222 and the shifter 223, the search phase angle corresponding to the minimal distance metric is selected as the phase estimation result output of the second-stage phase estimation configuration 22.

Figure 4:
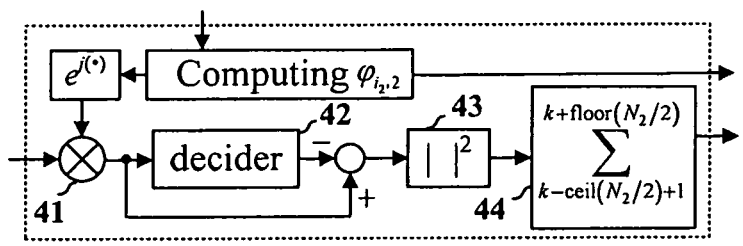
FIG. 4 is a schematic diagram of the structure of each metric computation module of a second stage phase estimation configuration of the embodiment shown in FIG. 2.

In the second-stage phase estimation configuration 22, each of the metric computation modules may be implemented by the configuration shown in FIG. 4. As shown in FIG. 4, the metric computation module includes a multiplier 41, a decider 42, a first calculator 43, and a second calculator 44, where the multiplier 41 is used to multiply the complex of a certain search phase angle obtained through calculation according to the search phase angle of the phase estimation configuration of the former stage by the input signal $r_k$, such that the phase of input signal is rotated by a corresponding angle;

where the search phase angle $\phi_{i_j,j}$ of the jth-stage is decided by the estimation phase angle (search phase angle) $\phi_{\tilde{i}_{j-1},j-1}$ of the (j−1)th-stage;

the decider 42 is used to perform hard decision to the output of the multiplier 41 according to QAM constellations;

the first calculator 43 is used to calculate the square of the modulus of the difference between the output of the multiplier 41 and the output of the decider 42; and the second calculator 44 is used to sum the output of the first calculator 43 within an average time window of a length of $N_j$ to obtain the distance metric value. Where, since the phase estimation configuration of this stage is a second-stage phase estimation configuration, j is 2.

In this embodiment, the compositions and functions of the third-stage phase estimation configuration to the last-stage phase estimation configuration are similar to those of the second-stage phase estimation configuration, which shall not be described any further. It can be seen from this that each of the metric computation modules of each stage of phase estimation configurations of the multi-stage phase estimation configuration relates to the summation operation within an average time window of a length of $N_j$ (j=1, 2, ..., J).

In this embodiment, since the phase estimation configuration of a former stage is more subject to the influence of pattern effect than the phase estimation configuration of a latter stage, the length of the average time window of the phase estimation configuration of the former stage is made to be greater than that of the phase estimation configuration of the latter stage, that is, $N_1 > N_2 > \ldots > N_J$, where $N_j$ (j=1, 2, ..., J) denotes the length of the average time window of the jth-stage, and J denotes the total number of the stages. In this way, the influence of the pattern effect may be mitigated.

In an embodiment, the length of the average time window of the phase estimation configuration of the former stage and that of the phase estimation configuration of the latter stage satisfy the following multiple relationship: $2L_{latter} < L_{former} < 3L_{latter}$, where, $L_{former}$ is the length of the average time window of the phase estimation configuration of the former stage, and $L_{latter}$ is the length of the average time window of the phase estimation configuration of the latter stage. Where in a typical actual case, it is optimal that the multiple value is 2.3 or 2.6. However, this embodiment is not limited thereto, and any multi-stage phase estimation configuration may be contained in the present invention, only if that the length of the average time window of the phase estimation configuration of a former stage is greater than that of the average time window of the phase estimation configuration of a latter stage is satisfied.

In a preferred embodiment, in a case where the same algorithm is used in a phase estimation configuration, in comparison with the length N of the average time window of a single-stage phase estimation configuration, the optimal value of $N_J$ of the phase estimation configuration of the last stage of this embodiment is equal to or approximately equal to the optimal average length N of the window in the case where only a single-stage configuration is used. Thus, the phase noise tolerance is ensured.

In another preferred embodiment, in a case where the same algorithm is used in a phase estimation configuration, in comparison with the number I of the search phase angles of a single-stage phase estimation configuration, the absolute value $|I_1 I_2 \ldots I_J - I|$ of the difference between the product $(I_1 I_2 \ldots I_J)$ of the numbers of the search phase angles of each of the phase estimation configurations and the total number I of the search phase angles needed in the case of a single-stage phase estimation configuration is minimal, and the sum $(I_1 + I_2 + \ldots + I_J)$ of the numbers of the search phase angles of each of the phase estimation configurations is minimal. In this way, the implementation complexity is efficiently decreased while mitigating the pattern effect.

In an existing multi-stage phase estimation configuration, the length $N_j$ of the average time window of each stage of the phase estimation configuration is equal, and on the premise of ensuring the laser phase noise tolerance, the number of the search phase angles needed by the first stage cannot be greatly lowered due to the influence of the pattern effect. In the multi-stage phase estimation configuration of this embodiment, the limitation that the average time window length is of the same length is eliminated, and $N_j$ of each stage is optimized. Since the phase estimation configuration of a former stage is more subject to the influence of pattern effect than the phase estimation configuration of a latter stage, in this embodiment, the length of the average time window of the phase estimation configuration of the former stage is made to be greater than that of the phase estimation configuration of the latter stage, and the influence of the pattern effect is mitigated by enlarging the length of the average time window. Furthermore, on the premise of mitigating the pattern effect, the total number of the search phase angles is made minimal in this embodiment by adjusting the numbers of the search phase angles of each stage, thereby lowering efficiently the implementation complexity.

The effect of the multi-stage phase estimation apparatus of this embodiment will be described below by way of an example.

In this example, a 64QAM or 256QAM high-order modulating signal is taken as an example. On the premise of ensuring the phase estimation performance, the number of phase angles needed in the use of a single-stage phase estimation method is I=64. If a two-stage phase estimation configuration is adopted, $I_1 = I_2 = 8$, so as to ensure that $|I_1 I_2 - I|$ is minimal, and $I_1 + I_2$ is minimal; in such a case, the total number of the search phase angles is 16. Likewise, if a three-stage phase estimation configuration is adopted, the ideal number of search phase angles of each stage of phase estimation configuration is 4, so as to ensure that $|I_1 I_2 I_3 - I|$ is minimal, and $I_1 + I_2 + I_3$; and the total number of the search phase angles is 12.

It can be seen from the above example that the use of a multi-stage phase estimation configuration in the multi-stage phase estimation apparatus of this embodiment makes the length of the average time window of the phase estimation configuration of a former stage to be greater than that of the average time window of the phase estimation configuration of a latter stage, and efficiently mitigates the influence of the pattern effect. And while on the premise of mitigating the influence of the pattern effect, the implementation complexity is efficiently lowered by recombining the number of search phase angles of the phase estimation configurations of every stage.

The multi-stage phase estimation apparatus of the above embodiments may be applicable to a digital coherent receiver based on QAM signal modulation. The application of the multi-stage phase estimation apparatus will be described below by way of two examples. However, the multi-stage phase estimation apparatus of this embodiment is not limited to these two examples, and any digital coherent receiver based on QAM signal modulation may use the multi-stage phase estimation apparatus proposed in this embodiment to perform phase estimation.

FIG. 5 is a schematic diagram of the structure of an embodiment of a digital coherent receiver. As shown in FIG. 5, the digital coherent receiver includes a receiver photoelectric front end 51, an analog-digital converter 52, a linear equalizer 53, a frequency difference estimator 54, a phase estimator 55, and a data recoverer 56, where the receiver photoelectric front end 51, the analog-digital converter 52, the linear equalizer 53, the frequency difference estimator 54 and the data recoverer 56 may be implemented by using the compositions of the existing digital coherent receiver, of which the identical functions are incorporated herein, which shall not be described any further.

The phase estimator 55 may be implemented by using the multi-stage phase estimation apparatus of this embodiment. The compositions and functions of such a multi-stage phase estimation apparatus were described above in detail, which are incorporated herein and shall not be described any further.

The digital coherent receiver using the multi-stage phase estimation apparatus of this embodiment can effectively reduce the implementation complexity and cost in the process of phase estimation of the digital coherent receiver.

For further improving the capacity, a coherent optical communication system usually uses polarization multiplexing at a transmission end, i.e. information is transmitted at both orthogonal polarizations, and a polarization-diversity coherent optical receiver is adopted at a receiving end. The multi-stage phase estimation apparatus of this embodiment is also applicable to a digital coherent optical receiver using polarization-diversity.

The linear equalizer 53, the frequency difference estimator 54, the phase estimator 55, and the data recoverer 56 can be a processor such as a digital signal processor.

FIG. 6 is a schematic diagram of the structure of an embodiment of a polarization-diversity digital coherent receiver. As shown in FIG. 6, the polarization-diversity digital coherent receiver includes a receiver photoelectric front end 61, a first analog-digital converter 621, a second analog-digital converter 622, a linear equalizer 63, a first frequency difference estimator 641, a second frequency difference estimator 642, a first phase estimator 651, a second phase estimator 652, a first data recoverer 661, and a second data recoverer 662, where the receiver photoelectric front end 61, the first analog-digital converter 621, the second analog-digital converter 622, the linear equalizer 63, the first frequency difference estimator 641, the second frequency difference estimator 642, the first data recoverer 661 and the second data recoverer 662 may be implemented by using the compositions of the existing polarization-diversity digital coherent receiver, of which the identical functions are incorporated herein, which shall not be described any further. As shown in FIG. 6, in this embodiment, the linear equalizer 63 may be implemented by using an existing FIR (finite impulse response) linear equalizer with a butterfly structure.

The first phase estimator 651 and the second phase estimator 652 may be implemented respectively by using the multi-stage phase estimation apparatus of this embodiment. The compositions and functions of such a multi-stage phase estimation apparatus were described above in detail, which are incorporated herein and shall not be described any further.

The polarization-diversity digital coherent receiver using the multi-stage phase estimation apparatus of this embodiment can effectively reduce the implementation complexity and cost in the process of phase estimation of the digital coherent receiver.

The linear equalizer 63, the first frequency difference estimator 641, the second frequency difference estimator 642, the first phase estimator 651, the second phase estimator 652, the first data recoverer 661, and the second data recoverer 662 can be a processor such as a digital signal processor.

FIG. 7 is a schematic diagram of the structure of an embodiment of the optical communication system using the digital coherent receiver. As shown in FIG. 7, this embodiment includes an optical transmitter 71, an optical fiber link 76 and an optical coherent receiver 75. The optical fiber link usually includes an exchange node 72 in a network, an optical fiber 73 and an optical amplifier 74. Where the optical coherent receiver 75 may be implemented by the digital coherent receiver shown in FIG. 5, or by the polarization-diversity digital coherent receiver shown in FIG. 6. The optical transmitter 71, the optical fiber link 76 and other related devices may be implemented by using existing known technologies, which shall not be described any further.

The optical communication system of this embodiment can effectively reduce the implementation complexity and cost in the process of phase estimation by using the digital coherent receiver or the polarization-diversity digital coherent receiver of the embodiments described above.

FIG. 8 is a flowchart of an embodiment of the multi-stage phase estimation method. As shown in FIG. 8, the method includes:

step 801: performing phase estimation to an input signal by using a multi-stage phase estimation configuration;

where the average time window length of the former stage phase estimation configuration is larger than that of the subsequent stage phase estimation configuration.

In a preferred embodiment, each stage of the phase estimation configuration uses a blind phase search (BPS) algorithm. The description of the BPS algorithm was given above, and shall not be described any further.

In another preferred embodiment, in the multi-stage phase estimation configuration, the optimal value of the average time window length of the last-stage phase estimation configuration is equal to the optimal average time window length in the case where a single-stage phase estimation configuration is used only.

In still another preferred embodiment, the absolute value of the difference between the product of the numbers of the search phase angles of each stage of the phase estimation configurations and the total number of the search phase angles needed in the case of a single-stage estimation configuration is minimal, and the sum of the numbers of the search phase angles of each stage of the phase estimation configurations is minimal.

The multi-stage phase estimation method of this embodiment may be applicable to the multi-stage phase estimation apparatus of the embodiments described above, and the steps of the method and the description of each of the features are identical to those in the multi-stage phase estimation apparatus of the embodiments described above, which are incorporated herein and shall not be described any further.

The multi-stage phase estimation method of this embodiment eliminates the limitation that the average time window length of each stage phase estimation configuration is of the same length, while average time window lengths of non-identical lengths are used, the pattern effect is overcome while ensuring the laser phase noise tolerance, further reducing the implementation complexity of the phase estimation. When the multi-stage phase estimation method is applied to digital coherent receivers or polarization-diversity digital coherent receivers, the implementation complexity and cost in the process of phase estimation may be reduced.

The above apparatus and method may be implemented by hardware, or may be implemented by hardware in combination with software. The embodiments relate to such a computer-readable program that when it is executed by a logic component such as a computer, it enables the logic component to implement the above apparatus or its compositions, or enables the logic component to implement all the method or steps described above. The present further relates to a storage medium in which the above program is stored, such as a hard disk, a floppy disk, a compacted disk, a DVD, or a flash memory, etc.

The above is provided with reference to particular embodiments. However, it should be understood by those skilled in the art that such a description is exemplary only and is not intended to limit the protection scope. Various variations and modifications may be made by those skilled in the art, and such variations and modifications fall within the scope.

The modes for carrying out the above embodiments further disclose the following supplements.

(Supplement 1). A multi-stage phase estimation apparatus, comprising a multi-stage phase estimation configuration, wherein each stage of the phase estimation configuration comprises:

a plurality of metric computation modules, each of the metric computation modules being used to compute distance metric and search phase angles according to an input signal and an initial search phase angle or a search phase angle of the former stage phase estimation configuration, wherein the number of the metric computation modules is equal to that of the search phase angles of this stage; and a selection module to select the search phase angle corresponding to the minimal distance metric as the phase estimation result output of this stage according to the computation results of all metric computation modules;

wherein the average time window length of the former stage phase estimation configuration is larger than that of the subsequent stage phase estimation configuration.

(Supplement 2). The multi-stage phase estimation apparatus according to Supplement 1, wherein $2L_{latter} < L_{former} < 3L_{latter}$, where, $L_{former}$ is the length of the average time window of the phase estimation configuration of the former stage, and $L_{latter}$ is the length of the average time window of the phase estimation configuration of the latter stage.

(Supplement 3). The multi-stage phase estimation apparatus according to Supplement 2, wherein $L_{former}$ is 2.3 or 2.6 times of $L_{latter}$.

(Supplement 4). The multi-stage phase estimation apparatus according to Supplement 1, wherein each stage of the phase estimation configuration uses a blind phase search algorithm.

(Supplement 5). The multi-stage phase estimation apparatus according to Supplement 4, wherein the optimal value of the average time window length of the last-stage phase estimation configuration is equal to the optimal average time window length in the case where a single-stage phase estimation configuration is used only.

(Supplement 6). The multi-stage phase estimation apparatus according to Supplement 5, wherein the absolute value of the difference between the product of the numbers of the search phase angles of each stage of the phase estimation configurations and the total number of the search phase angles needed in the case of a single-stage estimation configuration is minimal, and the sum of the numbers of the search phase angles of each stage of the phase estimation configurations is minimal.

(Supplement 7). A digital coherent receiver, comprising the multi-stage phase estimation apparatus according to any one of the supplements 1-6.

(Supplement 8). The digital coherent receiver according to Supplement 7, wherein the digital coherent receiver further comprises:

a receiver photoelectric front end device to receive a signal;

an analog-digital converting device to perform analog-digital conversion on the signal received by the receiver photoelectric front end device;

a linear equalizing device to linearly equalize the signal after being converted by the analog-digital converting device;

a frequency difference estimating device to estimate the frequency difference of the signal after being equalized by the linear equalizing device and provide the signal to the multi-stage phase estimation apparatus; and a data recovering device to recover the data of the signal after being estimated by the multi-stage phase estimation apparatus.

(Supplement 9). A polarization-diversity digital coherent receiver, comprising the multi-stage phase estimation apparatus according to any one of the supplements 1-6.

(Supplement 10). The polarization-diversity digital coherent receiver according to Supplement 9, wherein the polarization-diversity digital coherent receiver further comprises:

a receiver photoelectric front end device to receive a signal;

a first analog-digital converting device to perform analog-digital conversion on the signal of an h polarization direction received by the receiver photoelectric front end device;

a second analog-digital converting device to perform analog-digital conversion on the signal of a v polarization direction received by the receiver photoelectric front end device;

a digital filter linear equalizing device to linearly equalize the signal of an h polarization direction after being converted by the first analog-digital converting device and the signal of a v polarization direction after being converted by the second analog-digital converting device;

a first frequency difference estimating device to estimate the frequency difference of the signal after being equalized in the h polarization direction and provide the signal to one of the two multi-stage phase estimation apparatuses; and a second frequency difference estimating device to estimate the frequency difference of the signal after being equalized in the v polarization direction and provide the signal to the other one of the two multi-stage phase estimation apparatuses;

a first data recovering device to recover the data of the signal after being estimated by the one multi-stage phase estimation apparatus; and a second data recovering device to recover the data of the signal after being estimated by the other one of the multi-stage phase estimation apparatuses.

(Supplement 11). An optical communication system, comprising the coherent receiver according to Supplement 7 or Supplement 9.

(Supplement 12). A multi-stage phase estimation method, comprising:

performing phase estimation to an input signal by using a multi-stage phase estimation configuration;

wherein the average time window length of the former stage phase estimation configuration is larger than that of the subsequent stage phase estimation configuration.

(Supplement 13). The multi-stage phase estimation method according to Supplement 12, wherein $2L_{latter} < L_{former} < 3L_{latter}$, where, $L_{former}$ is the length of the average time window of the phase estimation configuration of the former stage, and $L_{latter}$ is the length of the average time window of the phase estimation configuration of the latter stage.

(Supplement 14). The multi-stage phase estimation method according to Supplement 13, wherein $L_{former}$ is 2.3 or 2.6 times of $L_{latter}$.

(Supplement 15). The multi-stage phase estimation method according to Supplement 12, wherein each stage of the phase estimation configuration uses a blind phase search algorithm.

(Supplement 16). The multi-stage phase estimation method according to Supplement 15, wherein in the multi-stage phase estimation configuration, the optimal value of the average time window length of the last-stage phase estimation configuration is equal to the optimal average time window length in the case where a single-stage phase estimation configuration is used only.

(Supplement 17). The multi-stage phase estimation method according to Supplement 16, wherein the absolute value of the difference between the product of the numbers of the search phase angles of each stage of the phase estimation configurations and the total number of the search phase angles needed in the case of a single-stage estimation configuration is minimal, and the sum of the numbers of the search phase angles of each stage of the phase estimation configurations is minimal.

What is claimed is:

1. The multi-stage phase estimation apparatus, comprising a multi-stage phase estimation configuration, wherein each stage of the phase estimation configuration comprises:
   a plurality of metric computation modules, each of the metric computation modules being used to compute a distance metric and search phase angles according to an input signal and an initial search phase angle or a search phase angle of a former stage phase estimation configuration, wherein a number of the metric computation modules is equal to that of a number of search phase angles of a same stage; and
   a selection module to select the search phase angle corresponding to a minimal distance metric as a phase estimation result output of the same stage according to the computation results of all metric computation modules;
   wherein an average time window length of the former stage phase estimation configuration is larger than that of a subsequent stage phase estimation configuration.

2. The multi-stage phase estimation apparatus according to claim 1, wherein each stage of the phase estimation configuration uses a blind phase search (BPS) algorithm.

3. The multi-stage phase estimation apparatus according to claim 2, wherein a optimum value of the average time window length of a last stage phase estimation configuration is equal to a optimal average time window length when only a single-stage phase estimation configuration is adopted.

4. The multi-stage phase estimation apparatus according to claim 3, wherein an absolute value of a difference between a product of the numbers of the search phase angles of each stage phase estimation configuration and a total number of the search phase angles needed in a single-stage phase estimation configuration is minimal, and a sum of the numbers of the search phase angles of each stage of phase estimation configuration is minimal.

5. A digital coherent receiver, comprising the multi-stage phase estimation apparatus as described in claim 1.

6. A polarization-diversity digital coherent receiver, wherein the polarization-diversity digital coherent receiver comprises two multi-stage phase estimation apparatuses as described in claim 1.

7. A multi-stage phase estimation method, comprising:
   performing phase estimation to an input signal by using a multi-stage phase estimation apparatus as recited in claim 1;
   wherein a multi-stage phase estimation apparatus comprises a multi-stage phase estimation configuration and an average time window length of a former stage phase estimation configuration is larger than that of a subsequent stage phase estimation configuration.

8. The multi-stage phase estimation method according to claim 7, wherein each stage of the phase estimation configuration in a multi-stage phase estimation apparatus uses a blind phase search (BPS) algorithm.

9. The multi-stage phase estimation method according to claim 7, wherein in the multi-stage phase estimation configuration in a multi-stage phase estimation apparatus, an optimum value of the average time window length of a last stage phase estimation configuration is equal to an optimal average time window length when only a single-stage phase estimation configuration is adopted.

10. The multi-stage phase estimation method according to claim 9, wherein an absolute value of a difference between a product of the numbers of the search phase angles of each stage phase estimation configuration in a multi-stage phase estimation apparatus and a total number of the search phase angles needed in a single-stage phase estimation configuration is minimal, and a sum of the numbers of the search phase angles of each stage of phase estimation configuration in a multi-stage phase estimation apparatus is minimal.

* * * * *